United States Patent
Liu et al.

(10) Patent No.: US 12,318,861 B2
(45) Date of Patent: Jun. 3, 2025

(54) METHODS OF JOINING DISSIMILAR METALS WITHOUT DETRIMENTAL INTERMETALLIC COMPOUNDS

(71) Applicant: THE REGENTS OF THE UNIVERSITY OF MICHIGAN, Ann Arbor, MI (US)

(72) Inventors: Fengchao Liu, Ann Arbor, MI (US); Pingsha Dong, Ann Arbor, MI (US); Wei Lu, Ann Arbor, MI (US); Alan Taub, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 17/126,987

(22) Filed: Dec. 18, 2020

(65) Prior Publication Data

US 2021/0205919 A1    Jul. 8, 2021

Related U.S. Application Data

(60) Provisional application No. 62/956,368, filed on Jan. 2, 2020.

(51) Int. Cl.
   *B23K 20/12*       (2006.01)
   *B23K 20/227*      (2006.01)
   *B23K 103/20*      (2006.01)

(52) U.S. Cl.
   CPC ...... *B23K 20/1255* (2013.01); *B23K 20/2275* (2013.01); *B23K 2103/20* (2018.08)

(58) Field of Classification Search
   CPC .......................................... B23K 20/122–128
   See application file for complete search history.

(56) References Cited

U.S. PATENT DOCUMENTS

| | | | |
|---|---|---|---|
| 4,411,952 A | 10/1983 | Sasaki et al. | |
| 4,732,312 A | 3/1988 | Kennedy et al. | |
| (Continued) | | | |

FOREIGN PATENT DOCUMENTS

| | | |
|---|---|---|
| CN | 101530947 A | 9/2009 |
| CN | 103894724 A | 7/2014 |
| (Continued) | | |

OTHER PUBLICATIONS

Liu et al. "Alloy amorphization through nanoscale shear localization at Al—Fe interface", Materials Today Physics vol. 15, Dec. 2020, (Year: 2020).*

(Continued)

*Primary Examiner* — Erin B Saad
*Assistant Examiner* — Carlos J Gamino
(74) *Attorney, Agent, or Firm* — Harness, Dickey & Pierce, P.L.C.

(57) ABSTRACT

A method of joining a first component and a second component that are made of dissimilar metals. In some embodiments, the method comprises applying friction between the first component and the second component sufficient to generate a layer of quasi-liquid metal and produce shear localization within the quasi-liquid metal at a dissimilar metal interface between the first component and the second component and terminating the application of friction at a predetermined time after generation of the quasi-liquid metal. In some embodiments, the method comprises applying amorphous metal between at least a portion of the first component and the second component at a dissimilar metal interface, heating the amorphous metal to a temperature between its glass transition temperature ($T_g$) and the lowest melting temperature of the components involved, and applying compression pressure to generate thermoplastic deformation of the amorphous metal.

3 Claims, 11 Drawing Sheets

(56) References Cited

U.S. PATENT DOCUMENTS

| | | | |
|---|---|---|---|
| 5,262,123 A | 11/1993 | Thomas et al. | |
| 6,676,008 B1* | 1/2004 | Trapp | B23K 20/1255 228/2.1 |
| 7,096,705 B2 | 8/2006 | Segal | |
| 8,114,474 B1* | 2/2012 | Dudt | F41H 5/045 427/191 |
| 8,397,974 B2 | 3/2013 | Schultz et al. | |
| 8,632,850 B2 | 1/2014 | Schultz et al. | |
| 8,636,194 B2 | 1/2014 | Schultz et al. | |
| 8,875,976 B2 | 11/2014 | Schultz et al. | |
| 8,893,954 B2 | 11/2014 | Schultz et al. | |
| 9,205,578 B2 | 12/2015 | Schultz et al. | |
| 9,266,191 B2 | 2/2016 | Kandasamy et al. | |
| 9,511,445 B2 | 12/2016 | Kandasamy | |
| 9,511,446 B2 | 12/2016 | Kandasamy et al. | |
| 9,527,230 B2 | 12/2016 | Takeuchi et al. | |
| 9,555,580 B1 | 1/2017 | Dykstra et al. | |
| 9,643,279 B2 | 5/2017 | Schultz et al. | |
| 9,862,054 B2 | 1/2018 | Kandasamy et al. | |
| 9,943,929 B2 | 4/2018 | Schultz et al. | |
| 10,105,790 B2 | 10/2018 | Kandasamy | |
| 10,189,063 B2 | 1/2019 | Lavender et al. | |
| 10,500,674 B2 | 12/2019 | Kandasamy et al. | |
| 10,583,631 B2 | 3/2020 | Kandasamy et al. | |
| 11,311,959 B2 | 4/2022 | Hardwick et al. | |
| 2001/0011177 A1 | 8/2001 | Peterson | |
| 2002/0158109 A1* | 10/2002 | Gendoh | B23K 20/1255 228/2.1 |
| 2002/0190100 A1* | 12/2002 | Duncan, Jr. | B23K 20/126 228/2.1 |
| 2003/0192939 A1 | 10/2003 | Mishra | |
| 2004/0057782 A1* | 3/2004 | Okamoto | B23K 33/004 403/271 |
| 2005/0081594 A1 | 4/2005 | Segal | |
| 2005/0121497 A1* | 6/2005 | Fuller | B23K 20/1255 228/2.1 |
| 2007/0040006 A1 | 2/2007 | Charles R. et al. | |
| 2008/0029581 A1* | 2/2008 | Kumagai | B23K 20/1255 228/101 |
| 2008/0041921 A1 | 2/2008 | Creehan et al. | |
| 2008/0236720 A1 | 10/2008 | Sigler et al. | |
| 2009/0140027 A1* | 6/2009 | Badarinarayan | B23K 20/1265 228/114.5 |
| 2011/0104515 A1* | 5/2011 | Kou | B32B 15/017 428/615 |
| 2011/0309131 A1 | 12/2011 | Hovanski et al. | |
| 2012/0279441 A1 | 11/2012 | Creehan et al. | |
| 2014/0064830 A1 | 3/2014 | Nagano et al. | |
| 2014/0367452 A1* | 12/2014 | Dinda | B23K 20/122 228/112.1 |
| 2015/0075242 A1 | 3/2015 | Eller et al. | |
| 2016/0175981 A1 | 6/2016 | Kandasamy | |
| 2016/0361868 A1 | 12/2016 | Wang | |
| 2017/0008121 A1* | 1/2017 | Li | B23K 20/129 |
| 2017/0043429 A1 | 2/2017 | Kandasamy | |
| 2017/0151766 A1 | 6/2017 | Wang et al. | |
| 2018/0022038 A1 | 1/2018 | Zhang et al. | |
| 2018/0050418 A1 | 2/2018 | Dong et al. | |
| 2018/0050419 A1* | 2/2018 | Das | B23K 20/126 |
| 2018/0073532 A1* | 3/2018 | Whalen | F16B 5/08 |
| 2018/0178455 A1 | 6/2018 | Washika et al. | |
| 2018/0311713 A1 | 11/2018 | Joshi et al. | |
| 2019/0054672 A1 | 2/2019 | Kajihara et al. | |
| 2019/0134864 A1 | 5/2019 | Park et al. | |
| 2019/0283173 A1 | 9/2019 | Grong et al. | |
| 2019/0375148 A1 | 12/2019 | Susnjara et al. | |
| 2020/0016687 A1* | 1/2020 | Whalen | B23K 20/127 |
| 2020/0262173 A1 | 8/2020 | Jung et al. | |
| 2020/0306869 A1 | 10/2020 | Hardwick et al. | |
| 2020/0306874 A1* | 10/2020 | Tsuta | B23K 20/1255 |
| 2020/0306876 A1* | 10/2020 | Tsuta | B23K 20/1255 |
| 2021/0078258 A1 | 3/2021 | Lalande et al. | |
| 2021/0197457 A1 | 7/2021 | Broach et al. | |
| 2021/0245293 A1 | 8/2021 | Hardwick et al. | |
| 2021/0308937 A1 | 10/2021 | Broach et al. | |
| 2021/0362380 A1 | 11/2021 | Liu et al. | |
| 2022/0080522 A1 | 3/2022 | Cox et al. | |
| 2022/0176633 A1 | 6/2022 | Hardwick et al. | |

FOREIGN PATENT DOCUMENTS

| | | | |
|---|---|---|---|
| CN | 106132666 A | 11/2016 | |
| CN | 106623936 A | 5/2017 | |
| CN | 106794546 A | 5/2017 | |
| CN | 106808095 A | 6/2017 | |
| CN | 206520145 U | 9/2017 | |
| CN | 108248058 A | 7/2018 | |
| CN | 108367467 A | 8/2018 | |
| CN | 110573290 A | 12/2019 | |
| CN | 111745287 A * | 10/2020 | |
| CN | 111941962 A | 11/2020 | |
| CN | 112123789 A | 12/2020 | |
| EP | 1844890 A1 * | 10/2007 | B23K 20/1235 |
| EP | 2777837 A1 | 9/2014 | |
| JP | S63164450 A | 7/1988 | |
| JP | H0289520 A | 3/1990 | |
| JP | 07256482 A | 10/1995 | |
| JP | 2000153374 A * | 6/2000 | B23K 20/1255 |
| JP | 2001071155 A * | 3/2001 | B23K 20/123 |
| JP | 2003275876 A * | 9/2003 | |
| JP | 2003275876 A1 * | 9/2003 | |
| JP | 2009090359 A | 4/2009 | |
| JP | 5353931 B2 | 11/2013 | |
| JP | 6315017 B2 | 4/2018 | |
| KR | 101316989 B1 | 10/2013 | |
| WO | 2012005722 A1 | 1/2012 | |
| WO | 2016199100 A1 | 12/2016 | |
| WO | 2017194793 A1 | 11/2017 | |
| WO | 2019026331 A1 | 2/2019 | |
| WO | 2019199100 A1 | 10/2019 | |

OTHER PUBLICATIONS

Liu et al., "From thick intermetallic to nanoscale amorphous phase at Al—Fe joint interface: roles of friction stir welding conditions", Scripta Materialia, vol. 191, Jan. 15, 2021, pp. 167-172 (Year: 2021).*

Ogura et al., "Partitioning evaluation of mechanical properties and the interfacial microstructure in a friction stir welded aluminum alloy/stainless steel lap joint", Scripta Materialia, vol. 66, Issue 8, 2012, pp. 531-534, (Year: 2012).*

Liu et al. "Alloy amorphization through nanoscale shear localization at Al—Fe interface", Materials Today Physics 15, p. 1-11, 2020, 1000252 (Year: 2020).*

Tanaka et al. "Dissimilar joining of aluminum alloy and steel sheets by friction stir spot welding*", Journal of Japan Institute of Light Metals, vol. 56, No. 6 (2006), pp. 317-322 (Year: 2006).*

Tanaka et a., "Dissimilar joining of aluminum alloy and steel sheets by friction stir spot welding", Jun. 2006 Journal of Japan Institute of Light Metals 56(6):317-322; DOI:10.2464/jilm.56.317 (Year: 2006).*

Liu et al., "Alloy amorphization through nanoscale shear localization at Al—Fe interface", Materials Today Physics vol. 15, Dec. 2020, 100252, https://doi.org/10.1016/j.mtphys.2020.100252 (Year: 2020).*

Chen et al., "Effects of initial oxide on microstructural and mechanical properties of friction stir welded AA2219 alloy", Materials & Design vol. 86, Dec. 5, 2015, pp. 49-54, https://doi.org/10.1016/j.matdes.2015.06.179 (Year: 2015).*

Dawood et al., "The influence of the surface roughness on the microstructures and mechanical properties of 6061 aluminium alloy using friction stir welding", Surface and Coatings Technology, vol. 270, May 25, 2015, pp. 272-283 (Year: 2015).*

Hussein et al. On Amorphous Phase Formation in Dissimilar Friction Stir Welding of Aluminum to Steel, Journal of Engineering and Applied Sciences, Apr. 2017, vol. 12, No. 7, pp. 69-81.

International Search Report and Written Opinion mailed Apr. 2, 2021 in PCT Application No. PCT/US2020/066613.

(56) References Cited

OTHER PUBLICATIONS

International Search Report and Written Opinion of International Application No. PCT/US2020/042847 on Oct. 30, 2020.
Forging. (1992). In C. G. Morris (Ed.), Academic Press Dictionary of Science and Technology (4th ed.). Elsevier Science & Technology. Credo Reference: https://search.credoreference.com/content/entry/apdst/forging/0?institutionId=7 43 (Year: 1992).
Forging. (2008). In Philip's encyclopedia. Philip's. Credo Reference: https://search.credoreference.com/content/entry/philipency/forging/0?institutionId=743 (Year: 2008).
Ho. P.S. et al. "Chemical bonding and reaction at metal/polymer interface." Journal of Vacuum Science & Technology A, 1985, vol. 3, pp. 739-745.
International Search Report and Written Opinion mailed Aug. 11, 2020 in International Application No. PCT/US2020/029880.
Francesco Lambiase et al. "Friction assisted joining of aluminum and PVC." Journal of Manufacturing Processes 29 (2017) 221-231.
F.C. Liu et al. "On formation of Al—O—C bonds at aluminum/polyamide joint interface." Applied surface Science 466 (2019( 202-209).
F.C. Liu et al. "A high-speed metal-to-polymer direct joining technique and underlying bonding mechanisms." Journal of Materials Processing Tech. 280 (2020) 116610.
S.C. Han et al. "Achieving a strong polypropylene/aluminum alloy friction spot joint via a surface laser processing pretreatment." Materials Science & Technology (2020).
International Search Report and Written Opinion regarding International Application No. PCT/US2021/033070, dated Sep. 9, 2021.
Extended European Search Report regarding Patent Application No. 20808972.2, dated Jul. 13, 2023.
Kondoh Katsuyoshi et al: "CO bond enhancing direct bonding strength between plastic and pure titanium", Materials Letters, vol. 211, Oct. 16, 2017 (Oct. 16, 2017), pp. 331-334, XP085274161, ISSN: 0167-577X, DOI: 10.1016/J.MATLET.2017.10.042.
International Search Report and Written Opinion of the ISA, issued in PCT/US2023/028221, mailed Nov. 15, 2023; ISA/US (10 pages).
Chinese Office Action regarding Patent Application No. 202080049281.3, dated Apr. 17, 2024.
Extended European Search Report regarding Patent Application No. 21809658.4, dated May 22, 2024.
O.P. Korobeinichev: "Kinetics of thermal decomposition of PMMA at different heating rates and in a wide temperature range", Thermochimica Acta, vol. 671, 2019,, Oct. 30, 2018 (Oct. 30, 2018), pp. 17-25, XP093161256, DOI: https://doi.org/10.1016/j.tca.2018.10.019 Retrieved from the Internet: URL:https://www.sciencedirect.com/science/article/pii/S0040603118303460#sec0055, abstract; figure 14.
Shear Assisted Processing and Extrusion, Pacific Northwest National Laboratory, Richland, Washington, SAE Media Group, techbriefs.com (Year: 2019).
Office Action regarding Chinese Application No. 202080091956.0, dated Aug. 23, 2024.
Liu Fengchao et al.: "3D printing of find-grained aluminum alloys through extrusion-based additive manufacturing: Microstructure and property characterization", Journal of Materials Science & Technology, Allertion Press, Amsterdam, NL, vol. 139, Sep. 24, 2022 (Sep. 24, 2022), pp. 126-136.
Tuncer Nihan et al.: "Solid-State Metal Additive Manufacturing: A Review", JOM: Journal of Metals, Springer New York LLC, United States, vol. 72, No. 9, Jul. 9, 2020 (Jul. 9, 2020), pp. 3090-3111.
Extended European Search Report regarding Patent Application No. 20854637.4, dated Aug. 18, 2023.
Office Action regarding Chinese Application No. 2020800919560, dated Dec. 24, 2024.
Chinese Office Action regarding Patent Application No. 202080091956.0, dated Mar. 29, 2024.

\* cited by examiner

METHODS OF JOINING DISSIMILAR METALS WITHOUT DETRIMENTAL INTERMETALLIC COMPOUNDS

CROSS-REFERENCE TO RELATED APPLICATIONS

This application claims the benefit of U.S. Provisional Application No. 62/956,368, filed on Jan. 2, 2020. The entire disclosure of the above application is incorporated herein by reference.

FIELD

The present disclosure relates to joining dissimilar metals and, more particularly, relates to joining dissimilar metals using quasi-liquid metal.

BACKGROUND AND SUMMARY

This section provides background information related to the present disclosure which is not necessarily prior art. This section provides a general summary of the disclosure and is not a comprehensive disclosure of its full scope or all of its features.

Direct bonding of incompatible dissimilar metals (e.g., Al/Fe, Ti/Fe, Mg/Fe, etc.) through either fusion-based approaches (e.g., arc or high energy beam) or solid-state methods (e.g. ultrasonic welding, conventional friction welding, and conventional friction stir welding) introduced brittle intermetallic compounds at the joint interface making the resultant welds inapplicable as safety-critical engineering structures. Conventional approaches have been focused on metallurgical means by influencing phase transformation kinetics and diffusion through reducing the processing peek temperatures and/or increasing the cooling rate during manufacturing. Unfortunately, these approaches only result in an incremental reduction in the size of intermetallic compounds at the joint interface. The problem remains unsolved.

In accordance with the principles of the present teachings, methods of joining a first component and a second component that are made of dissimilar metals are provided. In some embodiments, the method comprises applying rapid friction between the first component and the second component sufficient to generate a layer of quasi-liquid metal and shear localization at the interface between the first component and the second component, and terminating the application of rapid friction at a predetermined time after the generation of the quasi-liquid metal and shear localization. In some embodiments, the method of joining a first component and a second component comprises applying amorphous metal between the first component and the second component, heating the amorphous metal to a temperature above its glass transition temperature ($T_g$) and below the lowest melting temperatures of all the components involved to transform the amorphous metal to quasi-liquid metal, and applying compression pressure to deform the quasi-liquid metal. The methods according to the present disclosure enable new, cost-effective ways of manufacturing stronger dissimilar metal structures minimizing the presence of detrimental intermetallic compounds.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A showing atom position at a first time and FIG. 1B shows atom displacement during a period of 3 ps.

Corresponding reference numerals indicate corresponding parts throughout the several views of the drawings.

DETAILED DESCRIPTION

Figure 1A:
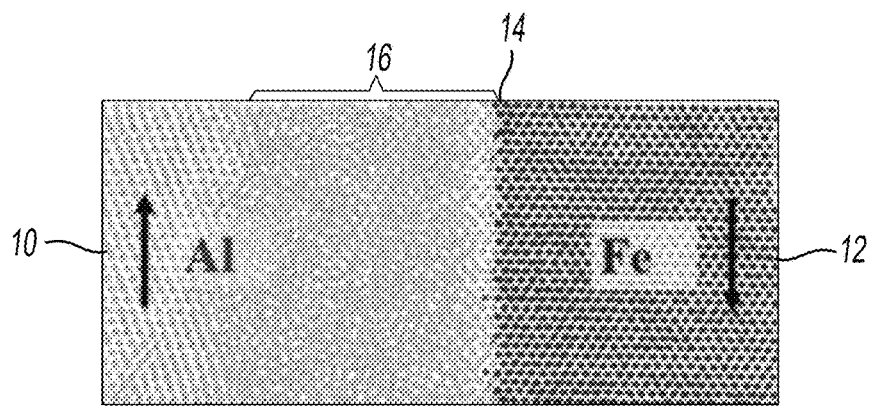
FIGS. 1A and 1B are molecular dynamic (MD) simulations showing formation of quasi-liquid metal under rapid sliding (friction) condition during sliding according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the teachings of the present disclosure, as illustrated in FIGS. 1-20, methods of and systems for joining at least a first component 10 and a second component 12 are disclosed having a novel dissimilar metal interfacial microstructure control methodology. It should be understood, as illustrated herein (see FIGS. 11 and 15), that the present teachings are equally useful for joining more than two components, such as first component 10, second component 12, and a third component 13.

In some embodiments, the first component 10 is made of a dissimilar metal relative to the metal of the second component 12. In this way, a quasi-liquid metal 16 and shear localization within the quasi-liquid metal 16 can be created and maintained at a dissimilar metal interface 14 disposed between the first component 10 and the second component 12. In some embodiments, this quasi-liquid metal 16 can be created by rapid friction between the first component 10 and the second component 12. Quasi-liquid metal herein can be defined as a metal in a liquid-like state at temperatures below the melting point of the metal. The quasi-liquid metal have a higher viscosity than the melton liquid metal.

Figure 1B:
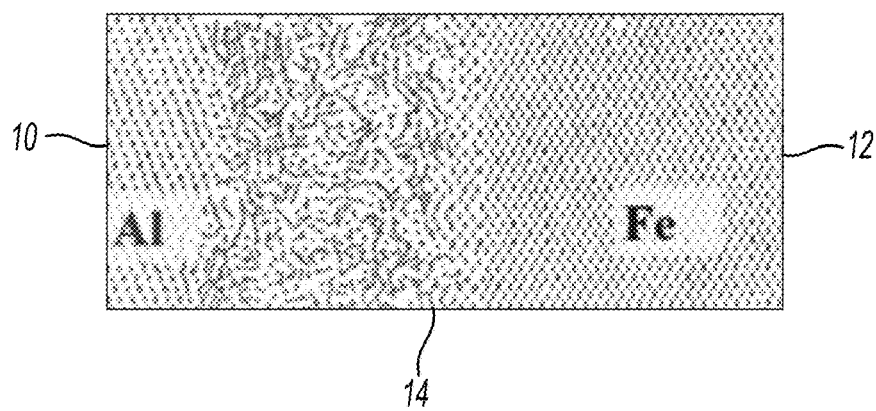

With particular reference to FIGS. 1A and 1B, a molecular dynamic (MD) simulation is provided illustrating formation of quasi-liquid metal 16 under rapid sliding (friction) condition according to the principles of the present teachings. FIG. 1A illustrates first component 10, being made of aluminum alloy (Al), for example, being in physical contact with second component 12, being made of steel (Fe), for example along the dissimilar metal interface 14. Applying rapid frictional sliding between the first component 10 and the second component 12 is sufficient to generate a layer of quasi-liquid metal 16 and shear localization at the dissimilar metal interface 14 between the first component 10 and the second component 12, as illustrated in FIG. 1A.

Figure 2:
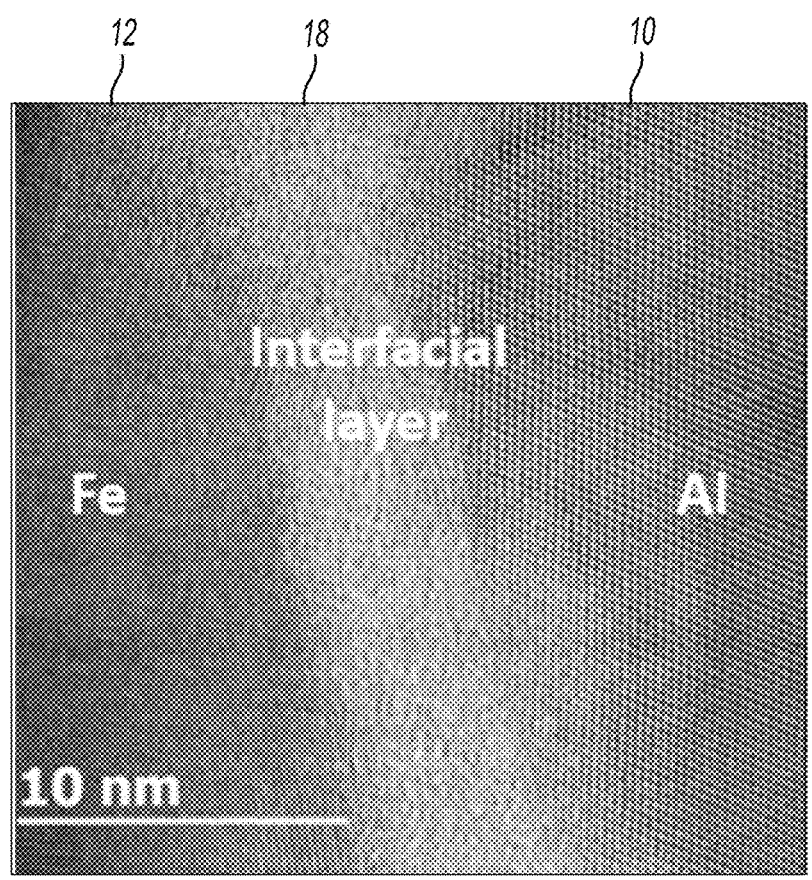
FIG. 2 is a high-resolution transmission electron microscope observation illustrating an interfacial layer or joint interface between steel (Fe) and aluminum alloy (Al) according to the principles of the present teachings.

According to the present teachings, the formation of quasi-liquid metal 16 and the shear localization within the quasi-liquid metal 16 promotes alloy amorphization at the dissimilar metal interface 14. A nanoscale amorphous layer 18 at dissimilar metal interface 14 has been produced successfully and repeatedly on bimetallic samples. As illustrated in FIG. 2, a transition region between the first component 10 and the second component 12 is not an intermetallic compound, but rather a nanoscale amorphous metal or layer 18 with averaged thickness about 10 nanometers, in some embodiments.

Figure 3:
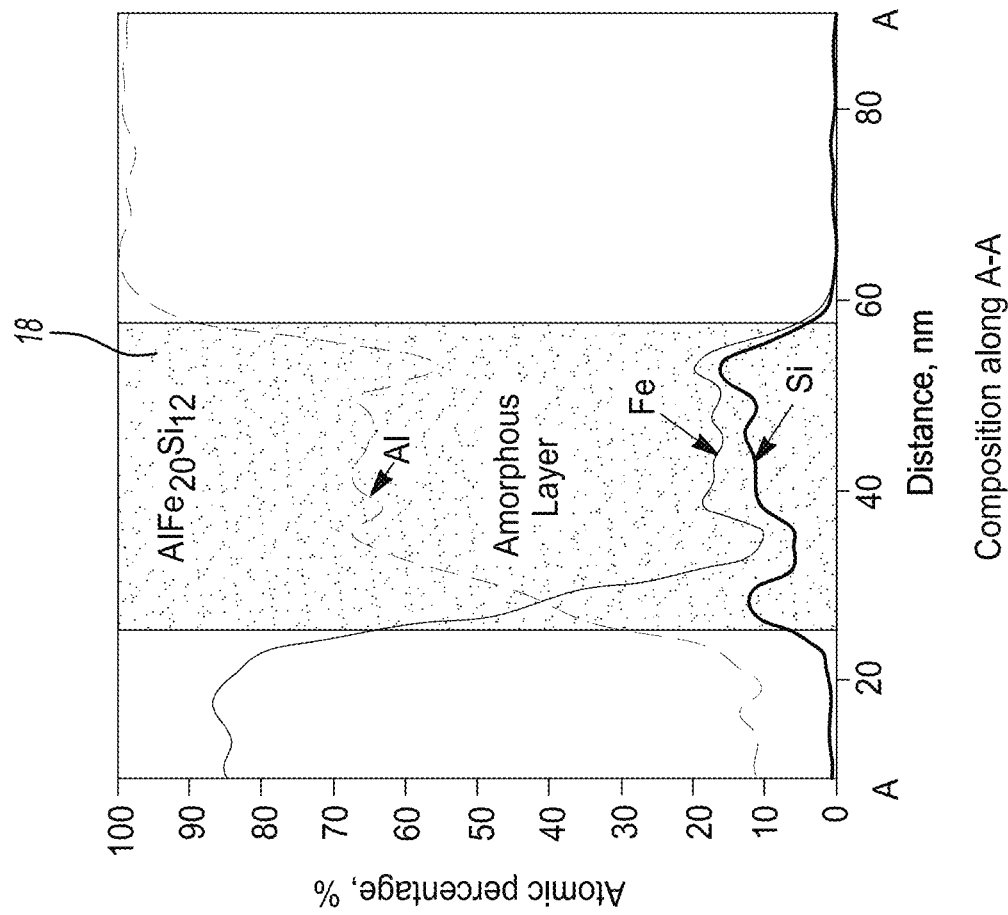
FIG. 3 is a three-dimensional (3D) spatial image provided by atom probe tomography showing atom chemical deposition across an Al—Fe joint interface and a composition graph taken along line A-A.

As illustrated in FIG. 3, detailed atomic probe tomography (ATP) examination reveals that a nanoscale amorphous layer 18 indeed forms and has a composition corresponding to a "Metallic Glass Former" composition. Such a metallic glass state composition could typically only be reached through rapid solidification in the range of $10^5$ to $10^{6\circ}$ C./s. However, according to the principles of the present teachings, we have found that through experimental joining trials the present teachings can achieve the desired composition with a cooling rate of less than $10^{2\circ}$ C./s. This difference is caused by the formation of quasi-liquid metal 16 at the dissimilar metal interface 14 created by the methods of the present teachings.

The above findings lead to two categories of novel dissimilar manufacturing processes that can be employed to produce stronger dissimilar metal structures:

1) In-situ generated quasi-liquid metal 16 at the dissimilar metal interface 14 through rapid friction induced shear localization within the quasi-liquid metal 16 beyond a threshold shear strain rate; and 2) Applied quasi-liquid metal 16 through the addition of metallic glasses that have good thermoplastic formability at elevated temperatures.

Firstly, as indicated, in some embodiments, an in-situ generated quasi-liquid metal 16 can be achieved by rapid friction between the first component 10 and the second component 12, being made of dissimilar metals, under certain contact pressure and relative velocity conditions resulting in a shear strain rate higher than the threshold shear strain rate. The threshold shear strain rate within the quasi-liquid metal 16 is estimated to be at or above $1 \times 10^4$ s$^{-1}$. The rapid friction needs to be terminated and the processing temperature needs to be reduced to temperatures lower than the crystallization temperature of the quasi-liquid metal 16 after sufficient quasi-liquid metal 16 has formed at the dissimilar metal interface 14 and before the occurrence of crystallization within the quasi-liquid metal 16. In some embodiments, the rapid friction needs to be terminated and the processing temperature needs to be reduced to temperatures lower than the crystallization temperature of the quasi-liquid metal 16 after sufficient quasi-liquid metal 16 has formed at the dissimilar metal interface 14 and before the occurrence of substantial crystallization within the quasi-liquid metal 16. In some embodiments, occurrence of substantial crystallization means 80% of the quasi-liquid metal has crystallized.

Secondly, as indicated, in some embodiments, quasi-liquid metal 16 can be applied through the addition of metallic glasses (whose glass transition temperature ($T_g$) lower than 90% of the lowest melting point of the metals to be welded) according to the following steps: (1) positioning metallic glasses at the dissimilar metal interface 14, (2) heating the metallic glasses to a temperature above the transition $T_g$ but below the lowest melting point of the metals involved, (3) applying a compressive pressure to generate thermoplastic deformation, and (4) reducing the welding temperature below the crystallization temperature of the quasi-liquid metal 16 before the occurrence of crystallization. In some embodiments, the welding temperature need to be reduced to below the crystallization temperature of the quasi-liquid metal 16 before the occurrence of substantial crystallization. In some embodiments, occurrence of substantial crystallization means 80% of the quasi-liquid metal has crystallized.

Figure 4:
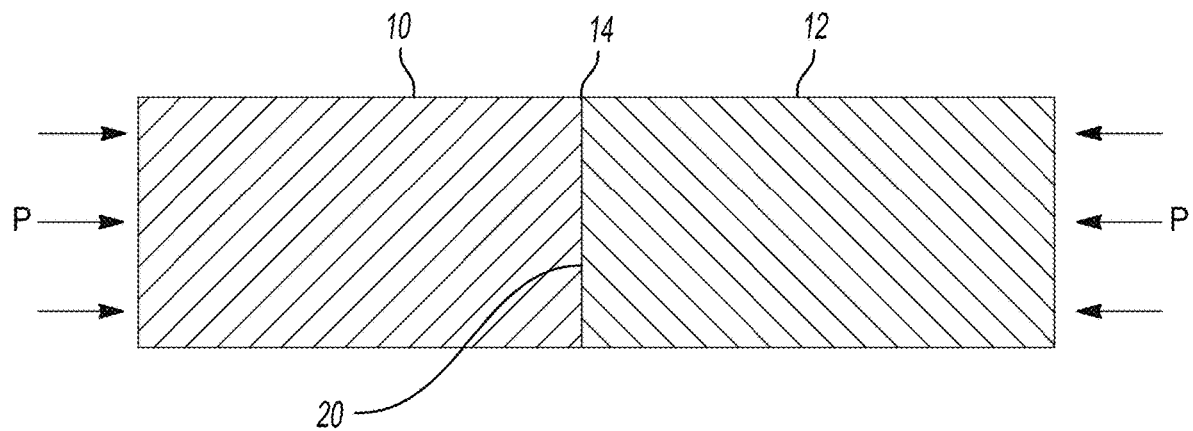
FIG. 4 is a cross-sectional schematic illustration of in-situ generating of quasi-liquid metal along a dissimilar metal interface via high-speed friction between a first component and a second component.

As illustrated in FIG. 4, in some embodiments, in-situ generated quasi-liquid metal 16 can be achieved by applying rapid friction, via applied pressure P and relative movement between the first component 10 and the second component 12. The rapid friction between the first component 10 and the second component 12 needs to be sufficient to generate an interfacial pre-melting (i.e. to form a thin layer of quasi-liquid metal 16) and shear localization within the quasi-liquid metal 16 at the dissimilar metal interface 14. In some embodiments, the rapid friction needs to be terminated and the processing temperature needs to be reduced to temperatures lower than the crystallization temperature of the quasi-liquid metal 16 after sufficient quasi-liquid metal 16 is formed at the dissimilar metal interface 14 and before the occurrence of substantial crystallization within the quasi-liquid metal 16.

In some embodiments, a quasi-liquid metal 16, being thicker than 100 nm at the dissimilar metal interface 14, is sufficient. In some embodiments, a quasi-liquid metal 16, being thicker than 10 nm at the dissimilar metal interface 14, is sufficient.

In some embodiments, the relative movement between the first component 10 and the second component 12 needs to be terminated within 1-3 seconds once sufficient quasi-liquid metal 16 is formed. In some embodiments, the relative movement between the first component 10 and the second component 12 needs to be terminated within 3-5 seconds once sufficient quasi-liquid metal 16 is formed.

In some embodiments, the first component 10 and the second component 12 each have a surface 20—the surface 20a of one component (a) is configured to be bonded to the surface 20b of the other component (b). In this way, the surface or surfaces 20 of each of the first component 10 and the second component 12 that are configured to be joined, welded, or assembled will be referred to as the faying surfaces 20. The joining, welding, or assembling of the faying surfaces 20 of first component 10 and second component 12 is along the dissimilar metal interface 14.

Figure 8:
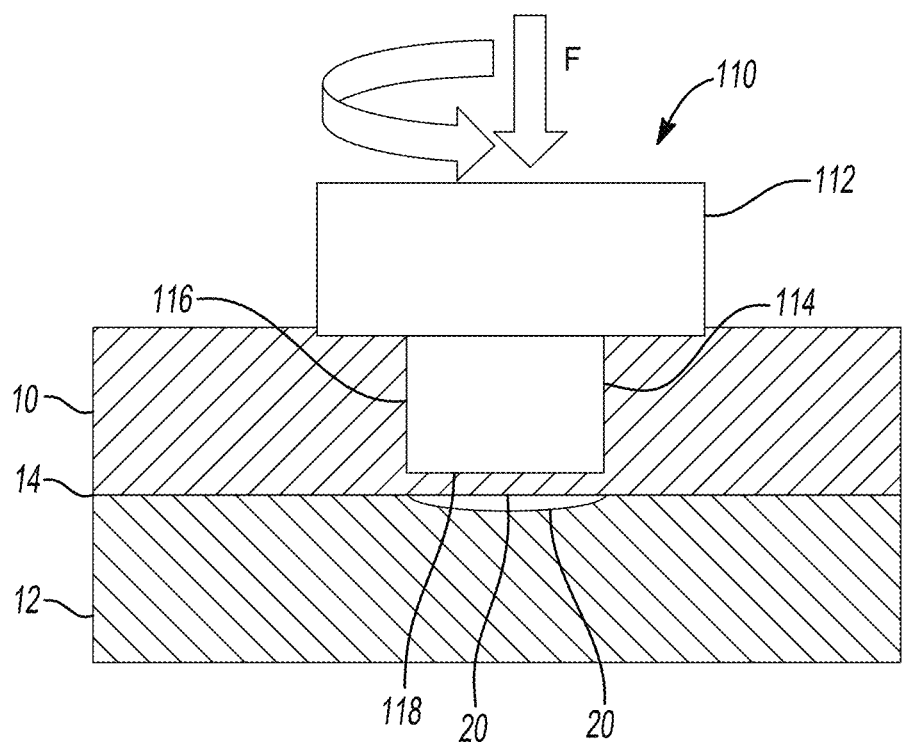
FIG. 8 is a cross-sectional schematic illustration of a system illustrating a shallow groove produced on a second component below a first component before welding.

In some embodiments, contamination on the faying surface(s) 20 of the first component 10 and the second component 12 should be removed prior to joining, welding, or assembling for the purpose to improve the quality of the bond. In some embodiments, the surface contamination can be removed through grinding. In some embodiments, the surface contamination can be removed through organic solvent. In some embodiments, surface oxidation on the faying surface 20 can be removed or be reduced to a thickness less than 2 nm before the welding or assembling process. In some embodiments, the faying surface(s) 20 can be flat. In some embodiments, as illustrated in FIG. 8, the faying surface 20 can be concave to form a shallow groove to enhance the rapid friction at the dissimilar material interface 14. In some embodiments, the shape of the faying surface 20 of the first component 10 can be complementary to the faying surface of the second component 12. In some embodiments, the shape of the faying surface 20 of the first component 10 can be different from the faying surface of the second component 12.

In some embodiments, the faying surface 20 of the harder component (i.e. the first component 10 or the second component 12) can have and/or be flattened to a roughness value of $R_a$<0.025 μm. In some embodiments, the faying surface 20 of the harder component can have and/or be flattened to a roughness value of $R_a$<0.1 μm. In some embodiments, the faying surface 20 of the harder component can have and/or be flattened to a roughness value of $R_a$<1 μm. In some embodiments, the faying surface 20 of the harder component can have and/or be flattened to a roughness value of $R_a$<5 μm.

Figure 5:
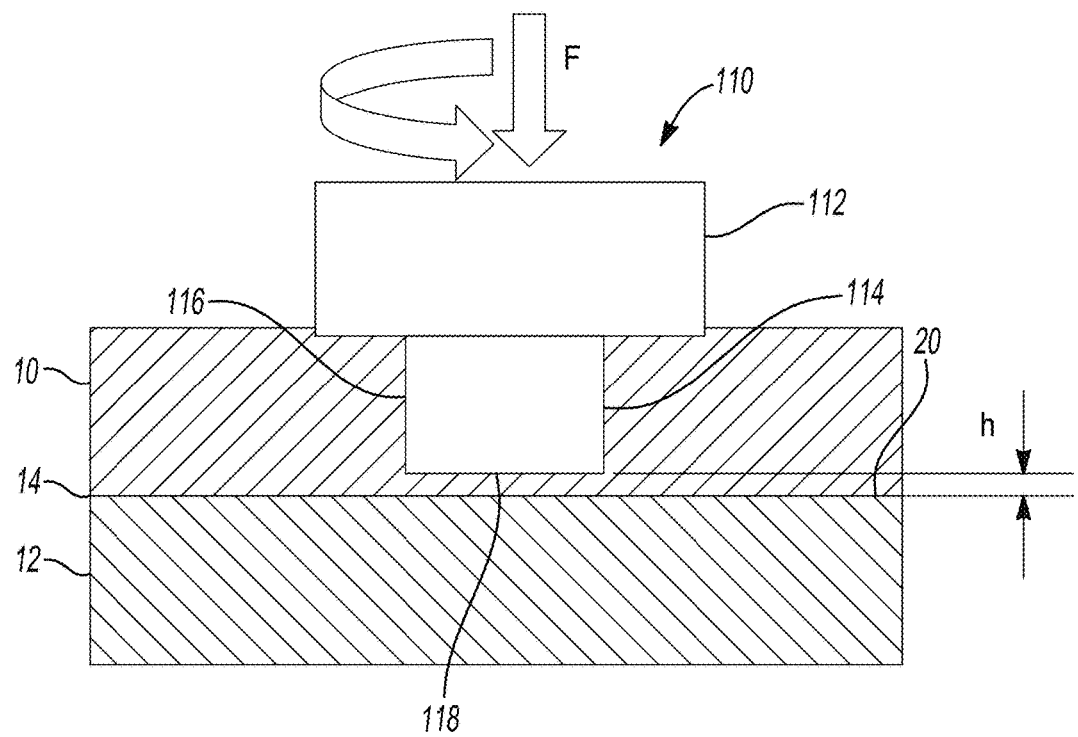
FIG. 5 is a cross-sectional schematic illustration of a system for producing lap joints by inserting a rotating tool through a first component to generate locally activated rapid friction at a bimetallic interface for in-situ generating of quasi-liquid metal at dissimilar metal interface.
Figure 6:
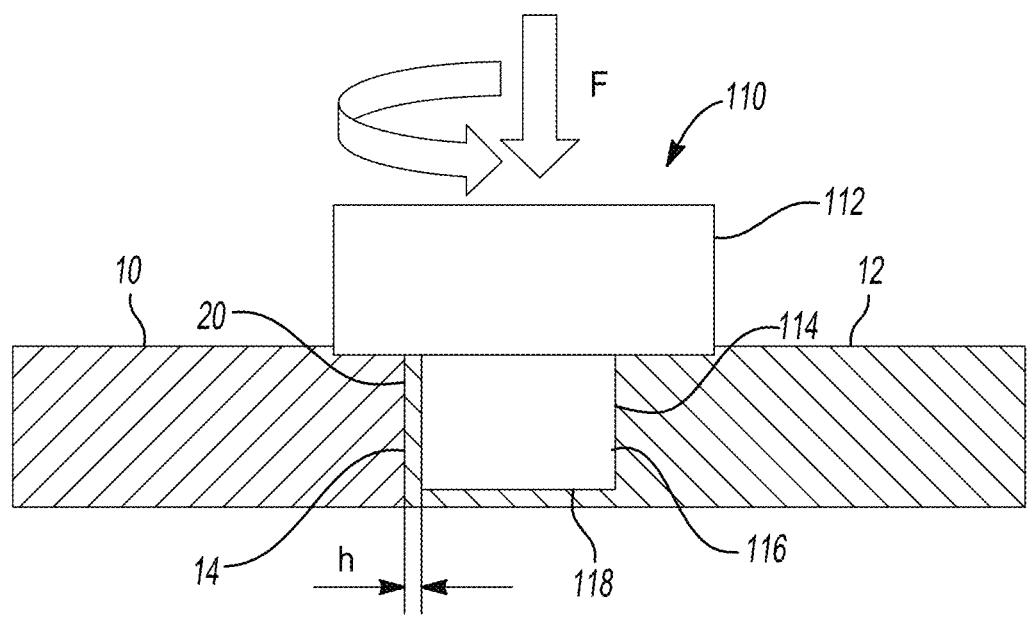
FIG. 6 is a cross-sectional schematic illustration of a system for producing butt joints by inserting a rotating tool through a first component to generate locally activated rapid friction at the bimetallic interface for in-situ generating of quasi-liquid metal at dissimilar metal interface.
Figure 7:
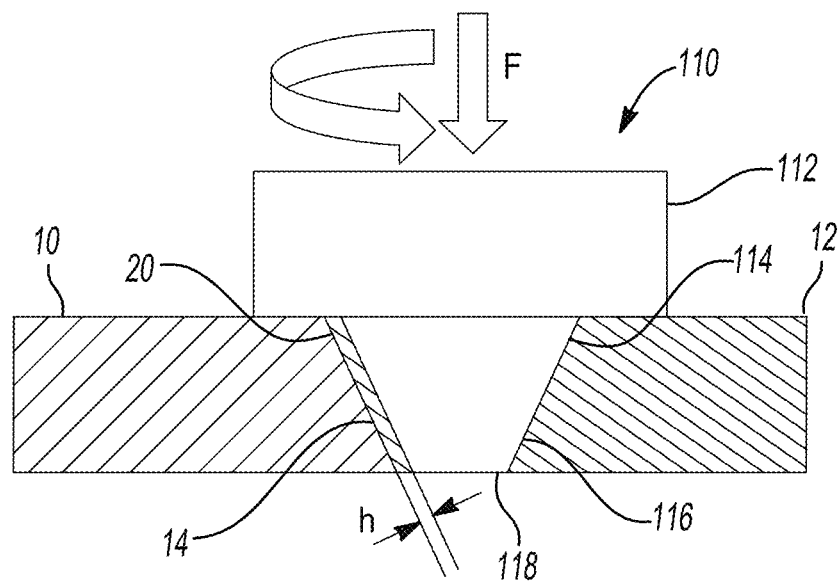
FIG. 7 is a cross-sectional schematic illustration of a system for producing beveled joints by inserting a rotating tool through a first component to generate locally activated rapid friction at the bimetallic interface for in-situ generating of quasi-liquid metal at dissimilar metal interface.
Figure 16:
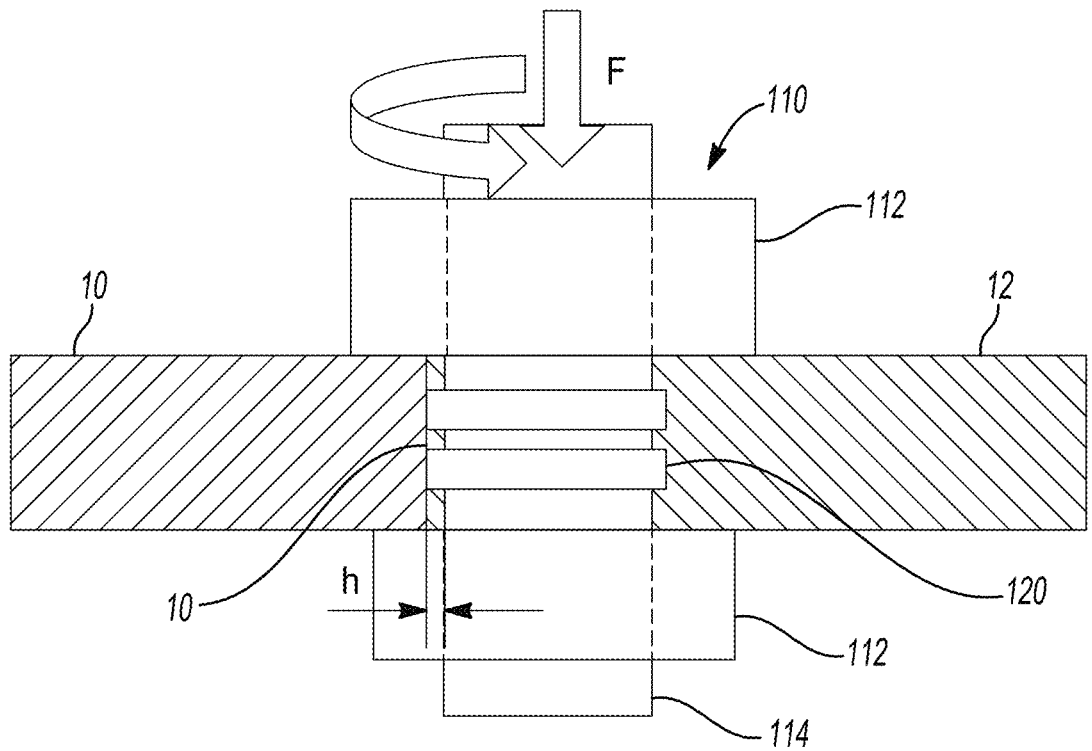
FIG. 16 is a cross-sectional schematic illustration of a system illustrating having double shoulder portions for constraining material flow.

With reference to FIGS. 5-7, in some embodiments, in-situ generated quasi-liquid metal 16 at dissimilar metal interface 14 can be achieved by inserting a rotating tool 110 through at least one of the first component 10 and the second component 12 to generate locally activated rapid friction at the dissimilar metal interface 14. In some embodiments, rotating tool 110 can comprise any one of a number of cross-sectional shapes as described herein. In some embodiments, rotating tool 110 can comprise one or more shoulder portions 112 and one or more probe members 114 extending from the shoulder portion 112. In some embodiments, as illustrated in FIG. 16, the rotating tool 110 comprises two shoulder portions 112. At least a portion of the probe member 114 physically contacting at least one of the first component 10 and the second component 12 to generate rapid friction at the dissimilar metal interface 14.

Figure 10:
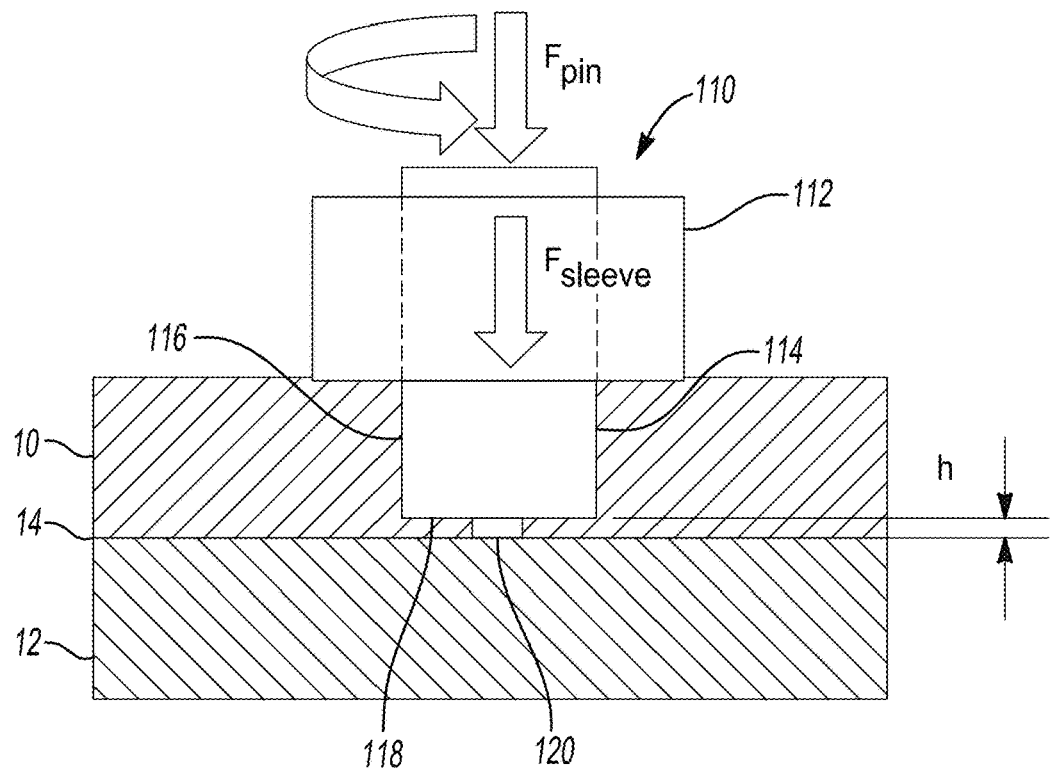
FIG. 10 is a cross-sectional schematic illustration of a system illustrating that the shoulder and probe portion can be operated separately.

In some embodiments, as illustrated in FIGS. 10 and 16, the shoulder portion(s) 112 and probe portion 114 can rotate independently and/or move independently in the axial direction. In some embodiments, the shoulder portion 112 and probe portion 114 can rotate independently. In some embodiments, only the probe member 114 rotates.

Figure 12:
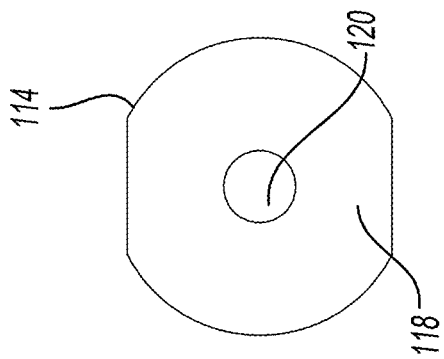
FIG. 12 illustrates various cross sectional shapes of the probe portion, including circular, polygonal, or irregular shape; and surface features added on the probe surface to increase surface roughness of the probe portion.
Figure 12:
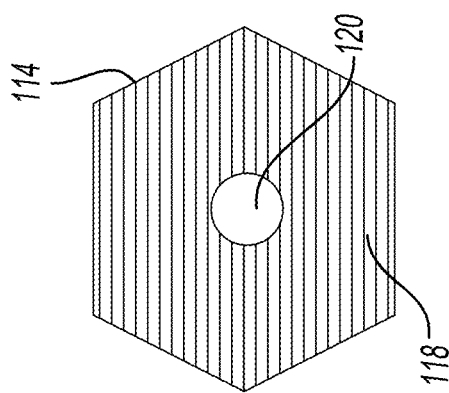
Figure 12:
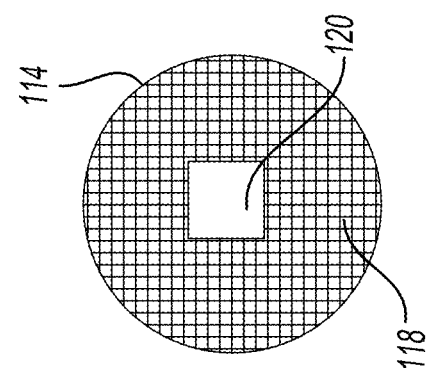
Figure 12:
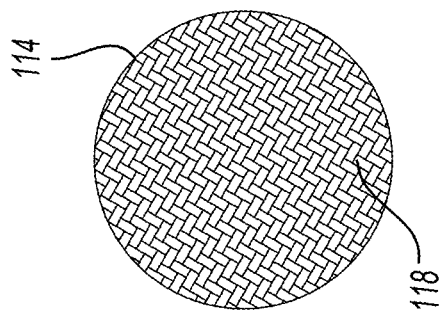

In some embodiments, the probe member 114 having at least one side surface 116 and at least one distal end surface 118. In some embodiments, the at least one distal end surface 110 can be concave, convex, or flat, or various combinations thereof. In some embodiments, as illustrated in FIG. 12, a cross sectional shape of the probe member 114 can be a circular, polygonal, or irregular.

In some embodiments, surface features that can increase the surface roughness can be added to the rotating tool 110, such as to the probe member 114, to enhance the rotational flow of material around rotating tool member 110 to enhance locally activated rapid friction between the dissimilar metals. In some embodiments, the probe member 114 can promote rotation of quasi-liquid metal around the probe member 114 and shoulder portion 112, being larger in diameter compared to the probe member 114, can act as a shoulder or barrier to inhibit or prevent flow of the quasi-liquid metal out of the processing zone.

Figure 9:
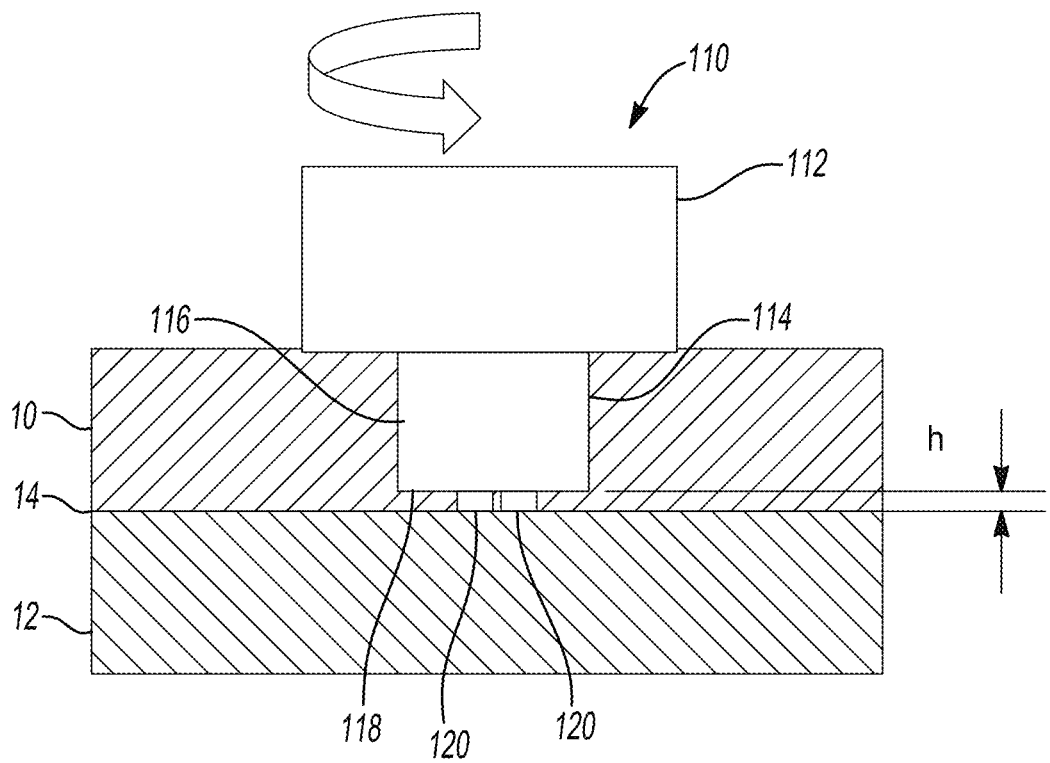
FIG. 9 is a cross-sectional schematic illustration of a system illustrating the use of one or more positioning props extending from the bottom of a probe portion to maintain a distance between the probe portion and a bonding line.
Figure 11:
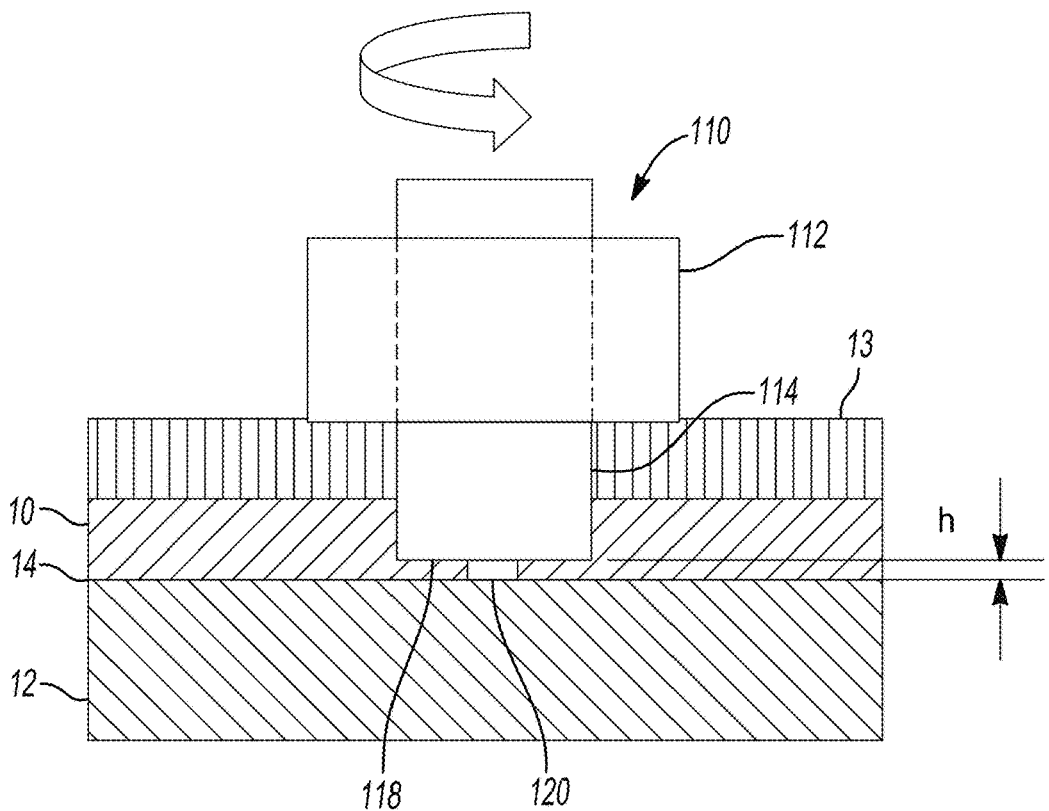
FIG. 11 is a cross-sectional schematic illustration of a system illustrating joining three components.

In some embodiments, as illustrated in FIGS. 9-11, rotating tool 110 can comprise a positioning prop 120 extending from distal end surface 118 of the probe member 114, from side surface 116, or a combination thereof. In some embodiments, rotating tool 110 can comprise the positioning prop 120 extending from side surface 116 of the probe member 114. In some embodiments, rotating tool 110 can comprise the positioning prop 120 extending from distal end surface 118 of the probe member 114. In some embodiments, the positioning prop 120 is located at the center of distal end surface 118 of the probe member 114. In some embodiments, the positioning prop 120 is deviate from center of distal end surface 118 of the probe member 114. In some embodiments, a plurality of positioning props 120 is used.

Figure 13:
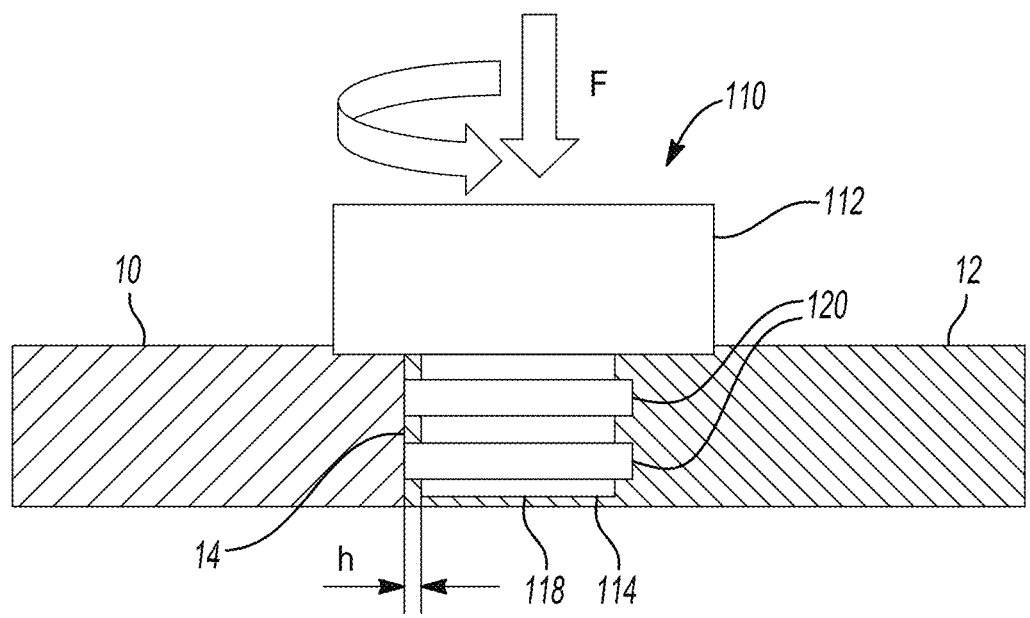
FIG. 13 is a cross-sectional schematic illustration of a system illustrating having one or more ring-type positioning props.

In some embodiments, as illustrated in FIG. 13, the positioning prop 120 can comprise one or more ring-like shaped members extending from side surface 116 of the probe member 114. In some embodiments, the positioning prop 120 extends entirely around the probe member 114. In some embodiments, the positioning prop 120 extends only a portion around the probe member 114. In some embodiments, the positioning prop 120 is located at the center of the probe member 114 in the axial direction. In some embodiments, the positioning prop 120 can be used to produce butt joints. In some embodiments, multiple rings can be used as the positioning prop 120. In some embodiments, an end surface of the positioning prop 120 is flat.

In some embodiments, positioning prop 120 is configured to provide a standoff distance from the dissimilar metal interface 14. For example, in some embodiments, as illustrated in FIGS. 9-11, the probe member 114 of rotating tool 110 can be spaced apart from dissimilar metal interface 14 a standoff distance, h. Although this standoff distance h can be achieve in many way (as illustrated and described herein), one or more positioning prop 120 can extend from distal end surface 118 and have a length equal to standoff distance h such that positioning prop 120 can contact faying surface 20 of the second component 12 to ensure proper positioning of the probe member 114 of rotating tool 110. In some embodiments, whether associated with positioning prop 120 or not, standoff distance h (and thus length of positioning prop 120) can be about 0.05 to 1 mm. In some embodiments, the surface area of a distal end surface of positioning prop 120 can be about 60% of the surface area of distal end surface 118 of the probe member 114.

In some embodiments, the positioning prop 120 can tightly contact the faying surface 20 of the second component 12. In some embodiments, the positioning prop 120 can slightly penetrate the faying surface 20 of the second component 12. In some embodiments, the relative positioning between the positioning prop 120 and faying surface 20 is controlled by monitoring and controlling the counterforce applied on the positioning prop 120.

Figure 14:
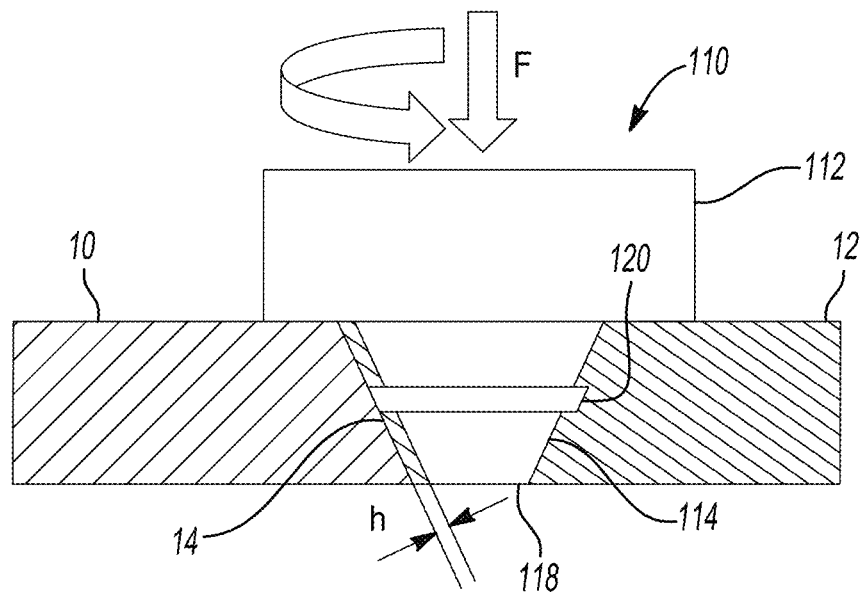
FIG. 14 is a cross-sectional schematic illustration of a system illustrating having one or more ring-type positioning props for a beveled faying surface.
Figure 15:
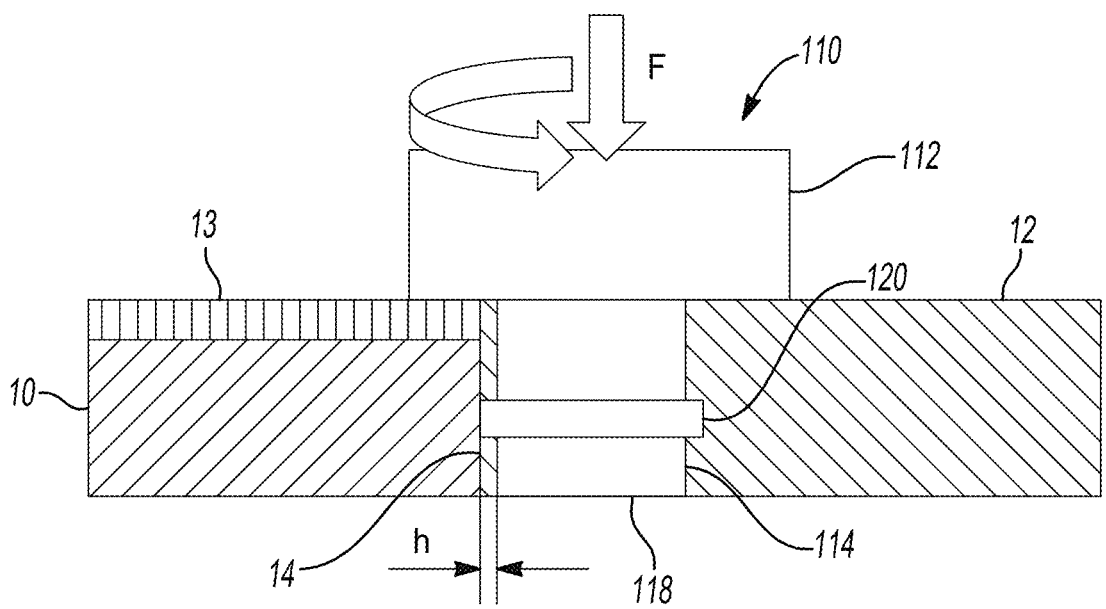
FIG. 15 is a cross-sectional schematic illustration of a system illustrating having one or more ring-type positioning props and three components.

In some embodiments, as illustrated in FIG. 14, the end surface of the positioning prop 120 is parallel to the faying surface 20. In some embodiments, the end surface of the positioning prop 120 is a regular shape. In some embodiments, the end surface of the positioning prop 120 is irregular shape. In some embodiments, the end surface of the positioning prop 120 is sharp.

In some embodiments, the positioning prop 120 of the probe member 114 and the probe member 114 are made from the same materials. In some embodiments, the positioning prop 120 of the probe member 114 and the probe member 114 are made from different materials. In some embodiments, the positioning prop 120 of the probe member 114 is made from harder and more wear resistant materials compared to the probe member 114.

In some embodiments, the rotating tool 110 can be inserted through the component (10, 12) that has a relatively lower melting point compared to the other component (12, 10). In some embodiments, the rotating tool 110 traverses along the welding direction to produce a long butt or lap joint.

Figure 17:
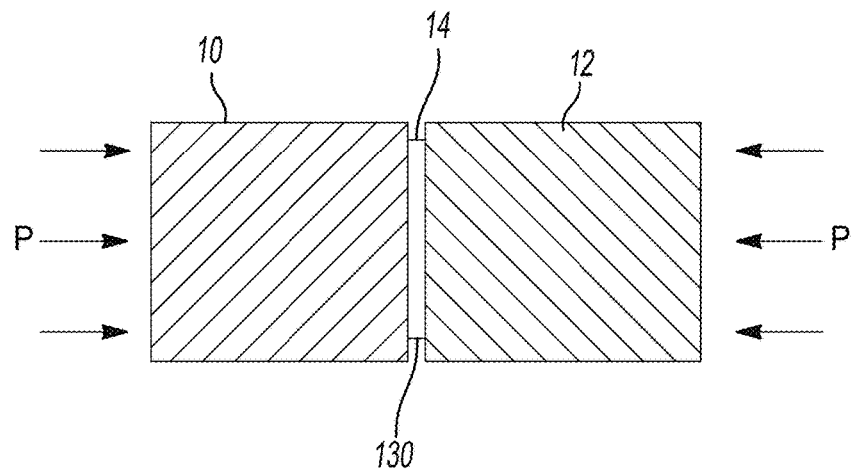
FIG. 17 is a cross-sectional schematic illustration of a system illustrating producing spot joint binding via applied external amorphous metals.

In some embodiments, interfacial amorphization through the addition of metallic glasses 130 (also known as amorphous metal) can be used to produce spot joints 132 (FIG. 17). Amorphous metal can be inserted and then heated to temperatures above its glass transition temperature ($T_g$) and below the lowest melting points of all components involved through friction energy, induction energy, or other heating sources. Once the amorphous metal is heated to the targeted temperatures, the metallic glass exists as a highly viscous liquid metal and increases its fluidity. A compression pressure can be applied to deform the highly viscous quasi-liquid metal 16.

In some embodiments, the processing temperature can be reduced below the crystallization temperature of the quasi-liquid metal 16 before substantial occurrence of crystallization within the quasi-liquid metal 16. In some embodiment, substantial occurrence of crystallization means 80% of the quasi-liquid metal has crystallized.

In some embodiments, the processing temperature can be reduced below the glass transition temperature of the quasi-liquid metal 16 before substantial occurrence of crystallization within the quasi-liquid metal 16.

In some embodiment, glass transition temperature of the metallic glasses 130 is lower than 90% of the lowest melting point of the components to be welded.

In some embodiments, interfacial amorphization through the addition of metallic glasses can be used to produce long lap joints or long butt joints.

Figure 18:
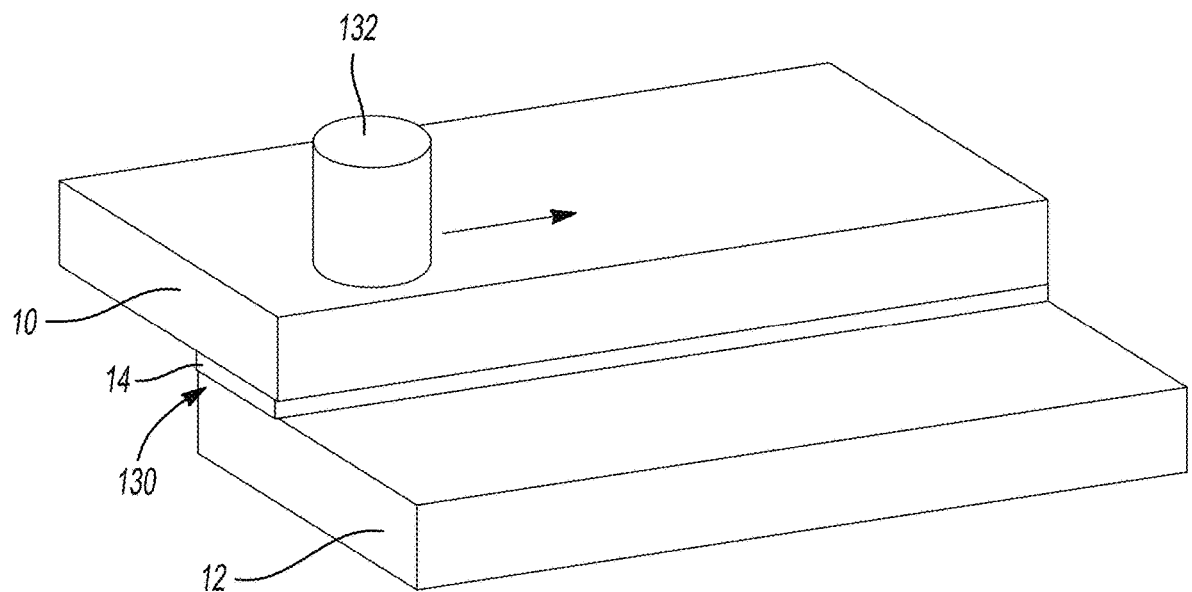
FIG. 18 is fabricating a linear lap joint through introducing external amorphous metals and an integrated external tool.
Figure 19:
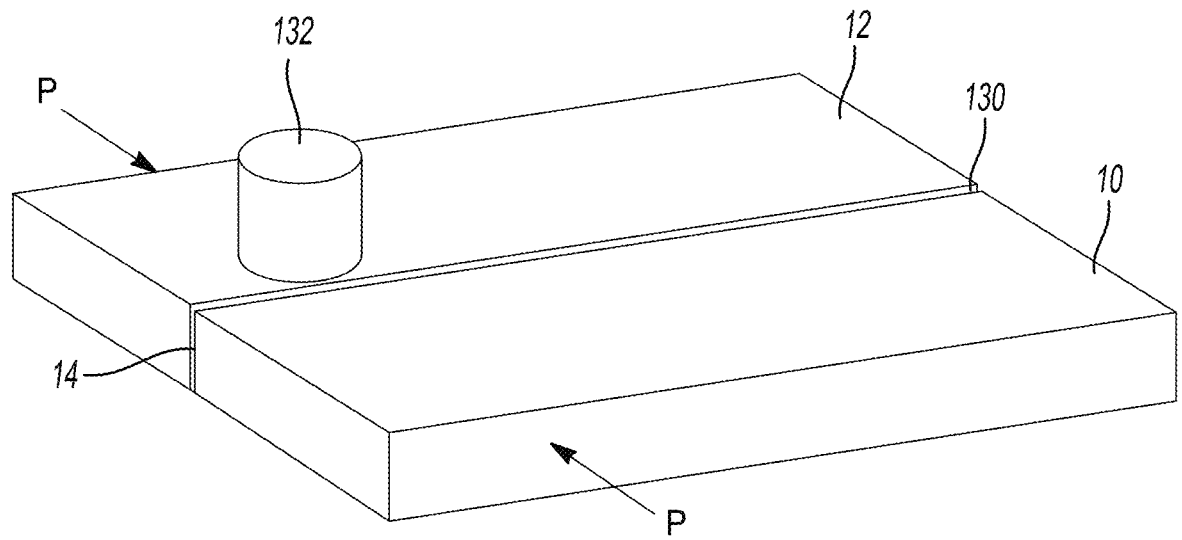
FIG. 19 is fabricating a linear butt joint through introducing external amorphous metals.
Figure 20:
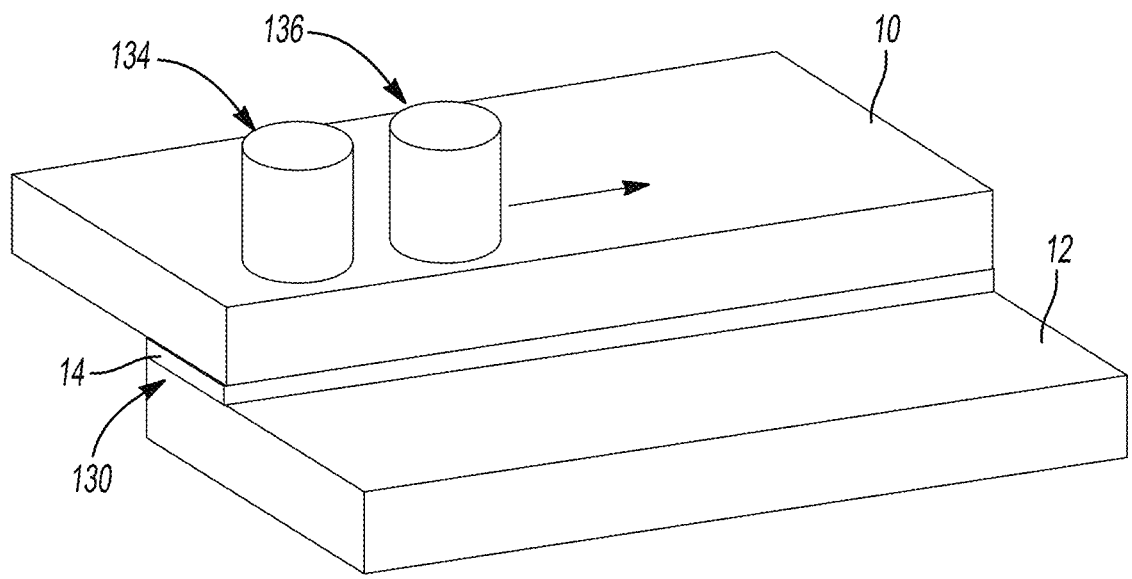
FIG. 20 is fabricating a linear lap joint through introducing external amorphous metals and separated heating and compression tools.

In some embodiments, heating and compression can be locally applied through an integrated tool 132 (FIGS. 18 and 19). In some embodiments, heating and compression can be locally applied through separated tools 134, 136 (FIG. 20). In some embodiments, local heating and/or compression pressure can be applied in sequence from the beginning to the end of the weld.

In some embodiments, a tool and method for producing weld between dissimilar material components can be achieved by:
   a. providing a rotating tool 110 comprising at least one shoulder portion 112, at least one the probe member 114 adjacent to the shoulder portion 112, and at least one positioning prop 120 extending from the probe member 114 wherein the overall terminal end surface of the positioning prop 120 is smaller than 60% of the probe member 114 end surface;
   b. penetrating the rotating probe member 114 into the first component 10 and maintaining the positioning prop 120 in contact with the surface of the second component 12 without significant penetration;
   c. the distance between the probe member 114 and the faying surface of the second component 12 being close enough to generate rapid friction at the interface of the first component 10 and the second component 12;
   d. the rapid friction can be high enough to generate quasi-liquid metal 16 at the interface of the first component 10 and the second component 12; and
   e. the rapid friction can be terminated and the processing temperature can be reduced to temperatures below the crystallization temperature of the quasi-liquid metal 16 after sufficient quasi-liquid metal 16 formed at the dissimilar metal interface 14 and before the occurrence of substantial crystallization within the quasi-liquid metal 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of joining a first component and a second component, the first component and the second component being made of dissimilar metals and each having a dissimilar metal interface and each with a faying surface, the first component having a lower melting temperature than the second component, the method comprising:
   smoothing the faying surface of the second component to a roughness value of Ra<0.025 µm and reducing surface oxidation of the second component to a thickness less than 2 nm before joining;
   inserting a rotating tool having one shoulder portion and one rotating probe portion into the first component, the one rotating probe portion is spaced apart from the faying surface of the second component by a standoff distance of 0.05 to 1 mm;
   rotating the rotating tool to generate a rapid friction between the second component and material of the first component rotating around the one rotating probe portion at the dissimilar metal interface, the rapid friction being sufficient to generate a layer of quasi-liquid metal and produces shear localization within the quasi-liquid metal at the dissimilar metal interface between the first component and the second component, the quasi-liquid metal being a metal in a liquid-like state at a temperature below the melting point of the first component and the second component, the quasi-liquid metal having a shear strain rate above $1 \times 10^4$ s$^{-1}$;
   one distal end surface of the one rotating probe portion having surface features to promote rotation of the quasi-liquid metal around the one rotating probe portion; and
   terminating the application of the rapid friction and reducing a processing temperature of the quasi-liquid metal below a crystallization temperature of the quasi-liquid metal within 3 seconds after generation of the quasi-liquid metal and before 80% of the quasi-liquid metal has crystallized within the quasi-liquid metal thereby joining the first component and the second component along a transition layer, the transition layer having a composition corresponding to a metallic glass former composition.

2. The method according to claim 1 wherein the one distal end surface of the one rotating probe portion is concave.

3. The method according to claim 1 wherein the faying surface of the second component comprises a groove.

* * * * *